United States Patent [19]

Zias

[11] Patent Number: 5,471,675

[45] Date of Patent: Nov. 28, 1995

[54] OBJECT ORIENTED VIDEO FRAMEWORK SYSTEM

[75] Inventor: Jeff Zias, Santa Clara, Calif.

[73] Assignee: Taligent, Inc., Cupertino, Calif.

[21] Appl. No.: 97,507

[22] Filed: Jul. 27, 1993

[51] Int. Cl.[6] ................................................. G06F 15/00
[52] U.S. Cl. ........................................... 395/162; 395/164
[58] Field of Search ........................... 395/162–166,500, 395/600

[56] References Cited

U.S. PATENT DOCUMENTS

| | | | |
|---|---|---|---|
| 4,821,220 | 4/1989 | Duisberg | 364/578 |
| 4,885,717 | 12/1989 | Beck et al. | 364/900 |
| 4,891,630 | 1/1990 | Friedman et al. | 340/706 |
| 4,953,080 | 8/1990 | Dysart et al. | 364/200 |
| 5,041,992 | 8/1991 | Cunningham et al. | 364/518 |
| 5,050,090 | 9/1991 | Golub et al. | 364/478 |
| 5,060,276 | 10/1991 | Morris et al. | 382/8 |
| 5,075,848 | 12/1991 | Lai et al. | 395/425 |
| 5,093,914 | 3/1992 | Coplien et al. | 395/700 |
| 5,119,475 | 6/1992 | Smith et al. | 395/156 |
| 5,125,091 | 6/1992 | Staas, Jr. et al. | 395/650 |
| 5,133,075 | 7/1992 | Risch | 395/800 |
| 5,136,705 | 8/1992 | Stubbs et al. | 395/575 |
| 5,151,987 | 9/1992 | Abraham et al. | 395/575 |
| 5,161,222 | 11/1992 | Montejo et al. | 395/500 |
| 5,165,018 | 11/1992 | Simor | 395/300 |
| 5,181,162 | 1/1993 | Smith et al. | 364/419 |
| 5,186,629 | 2/1993 | Rohen | 434/114 |
| 5,291,585 | 3/1994 | Sato et al. | 395/500 |
| 5,315,703 | 5/1994 | Matheny et al. | 395/164 |
| 5,335,346 | 8/1994 | Fabbio | 395/600 |
| 5,367,633 | 11/1994 | Matheny et al. | 395/164 |
| 5,371,885 | 12/1994 | Letwin | 395/600 |

OTHER PUBLICATIONS

K. Griggs, 'Organization Construction Set' Modeling Organizations with Visual Agents. System Sciences Int. Conf. (1993) pp. 320–328.

K. Kosbar, K. Schneider, Object–Oriented Modeling of Communication Systems. MILCOM '92 (1992) pp. 3.1.1–3.1.5.

M. Hitchens, J. Rosenberg, A Three–Level Object–Based Model. Computer Languages, Int. Conf. (1994) pp. 148–158.

G. Sundström et al., Principle Driven Design of an Integrated Graphical Support System: Enhancing Joint Human–Machine Net. Manage. Sys. Man & Cybernetics (1991) pp. 1133–1138.

OOPSLA '88 V.23(11), Nov. 1988, San Diego, California pp. 46–57, Weinand et al. "ET++ An Object–Oriented Application Framework in C++".

COMPSAC '89, Sep. 20, 1989, Orlando, Glorida, pp. 381–388, Lin et al. "Dynamic Window Configuration in an Object Oriented Programming Environment".

*Primary Examiner*—Mark R. Powell
*Assistant Examiner*—U. Chauhan
*Attorney, Agent, or Firm*—Keith Stephens

[57] ABSTRACT

A video framework for use in a data processing system provides parallel hierarchies of video device drivers and video device handles, which are created by video device driver objects, and a hierarchy of data encapsulators contained by a subclass of the hierarchy of video device handles to encapsulate configuration information describing the functionality of a display device connected to a data processing system. Applications access video device drivers through ones of the video device handles at respective levels of the video device handle hierarchy. When a change of configuration is made or requested in for the data processing system or any display connected thereto, corresponding video display handles issue a signal to lock down drawing tasks before video handles are created or altered to carry out the configuration change. The video framework thus allows changes to be made in configuration of the system and/or functionality of the display devices without loss of information displayed to a user and maintains a default functionality of displays connected to the data processing system.

32 Claims, 10 Drawing Sheets

OBJECT ORIENTED VIDEO FRAMEWORK SYSTEM

BACKGROUND OF THE INVENTION

1. Field of the Invention

The present invention generally relates to computer systems having output devices and, more particularly, to computer systems which may be connected to different types and numbers of display devices for achieving compatibility therewith and improving uniformity of performance and user convenience.

2. Description of the Prior Art

Display devices have been long-preferred as output devices for computers and data processing systems of all kinds for the purpose of interaction and interfacing with a user. Displays may be rapidly changed and are capable of presenting a very large amount of information to a user. This information may concern the operation of the data processing system and applications running thereon as well as data being processed and entered by the user.

In order to increase the ease with which such information may be perceived and assimilated by a user, color displays of relatively high resolution are in widespread use and available from many manufacturers. While some standards have become accepted in the industry, uniformity of performance or even compatibility between data processors, applications which may be run thereon and output devices which may be connected thereto is not often provided by various output devices. For example, to achieve compatibility and uniformity of performance for printers, it is now common for software developers and suppliers to provide software printer drivers for a multiplicity of printers for control thereof by the contents of files which may be processed by the application. However, it is to be understood that achieving an acceptable degree of uniformity between printers is much more straightforward than for display devices since many printers are monochromatic and contain their own resident and often standardized fonts. Moreover, in printers, there is little interaction between most applications and the resolution or image patterns of individual image dots which may be produced, whereas, in displays, the application must often control the generation of the image in order to properly and accurately communicate information to the user. Also, more than one printer will seldom be used for production of a single document and absolute uniformity of performance is seldom expected.

In contrast, it is relatively common in present day workstations and other data processor systems to use a plurality of displays simultaneously. It is also common to freely substitute one type of display for another for upgrading of the system or to accommodate certain applications. Requirement for repair of a monitor may also cause a user to substitute one display for another. Displays also encompass greater variety than printers. For example, the display screen aspect ratios may vary, such as for data in various television signal formats or so-called "landscape" (longer horizontal axis) or "portrait" (longer vertical axis) displays; the latter being often preferred to display document images. Aspect ratios may also vary more subtly within either of these types of display, depending on display dimensions. Resolution in each of the horizontal and vertical directions may vary as will the number of pixels addressable in each coordinate direction, both as an incident of the display and the application or even the operating system.

Further, color reproduction will seldom be precisely consistent even between displays of the same type and from the same manufacturer. At the same time, there is a trend toward use of a larger color gamut in which more colors may be used by an application. Therefore, precise rendering of colors, hues, intensities and contrast has become increasingly important to users and critical to the appropriate interaction of the user with various applications.

As with printers, it is common to provide display drivers at least partially in software for ease of control and set-up although hardware display drivers are not uncommon in simple devices. This poses at least three types of problems.

The first and most critical type of problem stems from the practice in the art of using the display to present error message and system operating instructions. In a case where a display driver card is to be used with particular software, the card may be installed and the system booted before the software for the card is installed. During the boot procedure, the processor or bus manager will find the video card and look for the corresponding software files to instantiate the display driver and the video card object. If these files (e.g. library files) cannot be found, the system cannot draw to the display to even provide a prompt for installation of the required files in order to run the display card. Since a printer will not necessarily be present as an output device, all that can be done is to cause the production of some sounds which have sufficient syntactic content for simple diagnostic indication. The only reasonable alternatives to this scenario are to provide for low-level alternative display or emulation on the card, such as is done on VGA cards and which increases the expense thereof, provide a bootable floppy disk which contains the video driver (also an expense factor) or force the user, through documentation or otherwise, to install the software before installation of the board. However, any time such a problem is encountered, user confidence in the system may be adversely affected.

The second type of problem is somewhat less critical to system operation but still of extreme importance to the user interface presented by the display, particularly where two or more applications may be simultaneously running or where two or more display devices may be connected to the system. In the case where only one application is running at any given time, the display presentation is important to the extent of provision of generally appropriate colors and the development of sufficient color or grey-scale differences to be readily identifiable and distinct to the user. The exact color may be somewhat more important in regard to graphics applications but some variation is tolerable as long as the user can identify the color specified for the graphic being manipulated. Further, in such a case, the operator may specify false-color for display in order to distinguish similar hues. Likewise, some variation in the number of pixels addressed and the aspect ratio of the image is also tolerable.

However, when multiple displays are generated in different windows by plural applications, it becomes more important to consistently present colors and to match colors between applications in the way in which the applications interact with the display driver. Therefore, if different applications provide their own interfaces to the display, some mechanism must be provided to reconcile them. The problem becomes far more complex when plural displays are provided and provision is made, as is preferable, for various windows to be freely movable between displays or even divided between monitors (e.g. adjacent display areas formed on separately addressable devices such as is often provided in liquid crystal displays or fiber optic screen CRTs. In this case, the applications must each have the capacity to access the device driver for each of the displays and to synchronize display generation between them.

The third type of problem may be considered as a special case of the second. As discussed above, it is common to configure the system during the boot operation and all available displays will recognized at that time. However, where plural displays are provided, the configuration of the system may change such as when a particular monitor is turned on or off or a monitor is seized by another processor or user application. This latter type of facility may be provided where a workstation with plural display devices is to be used by more than one user and some display devices may be shared or exclusively allocated to one particular user. In any of these cases, some provision must be made for not only reconfiguration of the system during operation but also for the preservation of all user displays such as windows allocated to a user when the number of display devices available for those displays may be suddenly changed.

While some of these problems may be individually handled by special subroutines or objects invoked when a change is made, no approach to simultaneously addressing these problems has, to date, been proposed.

SUMMARY OF THE INVENTION

It is therefore an object of the present invention to provide a video framework architecture for installation, configuration and utilization of video devices that provide drawing, animation and video configuration services.

It is another object of the invention to provide a generalized framework for interfacing of applications and display drivers to achieve correct and consistent control of display presentation which is both machine- and display-device-independent.

It is a further object of the invention to provide a video framework, particularly for application developers, which increases flexibility and ease of display feature accommodation in a consistent and systematic manner.

It is yet another object of the invention to provide a video framework which will accommodate dynamic reconfiguration of a data processing system as changes in display requirements occur in order to increase flexibility of the system to meet user requirements.

In order to accomplish these and other objects of the invention, a video framework is provided comprising a class of video device drivers having at least one subclass subclassed therefrom, a class of video device handles contained by objects of said class of video device drivers, the class of video device handles having a subclass subclassed therefrom corresponding to each subclass subclassed from the class of video device drivers and contained by objects of respective ones of each subclass subclassed from the class of video device drivers, a class of data encapsulators having at least one video device data encapsulator subclass subclassed therefrom and contained by objects of a subclass subclassed from the class of video device handles.

In accordance with another aspect of the invention, a video framework method is provided including the steps of creating a video device driver object from a configuration access manager object, creating a video device handle object from the video device driver object, creating a video device data encapsulator object from the video device handle object, sending parameters of the video device handle object to a layer server, and sending parameters of the video device data encapsulator object to a hardware configuration server.

In accordance with a further aspect of the invention, a method of operating a data processing system having at least one display device connected thereto is provided, comprising the steps of creating a video device data encapsulator object in response to detection of at least one of a configuration change and a request for a configuration change of said data processing system, sending a parameter of the configuration change to a video device handle object which contains the video device data encapsulator object, locking down drawing tasks on a display device in response to a signal generated by the video device handle object, changing configuration of the data processing system by altering or creating a video device handle, issuing a command to a video device handle to regenerate or request regeneration of a display corresponding to the drawing tasks as locked, and releasing the locking of the drawing tasks.

BRIEF DESCRIPTION OF THE DRAWINGS

The foregoing and other objects, aspects and advantages will be better understood from the following detailed description of a preferred embodiment of the invention with reference to the drawings in which.

DETAILED DESCRIPTION OF A PREFERRED EMBODIMENT OF THE INVENTION

Figure 1A:
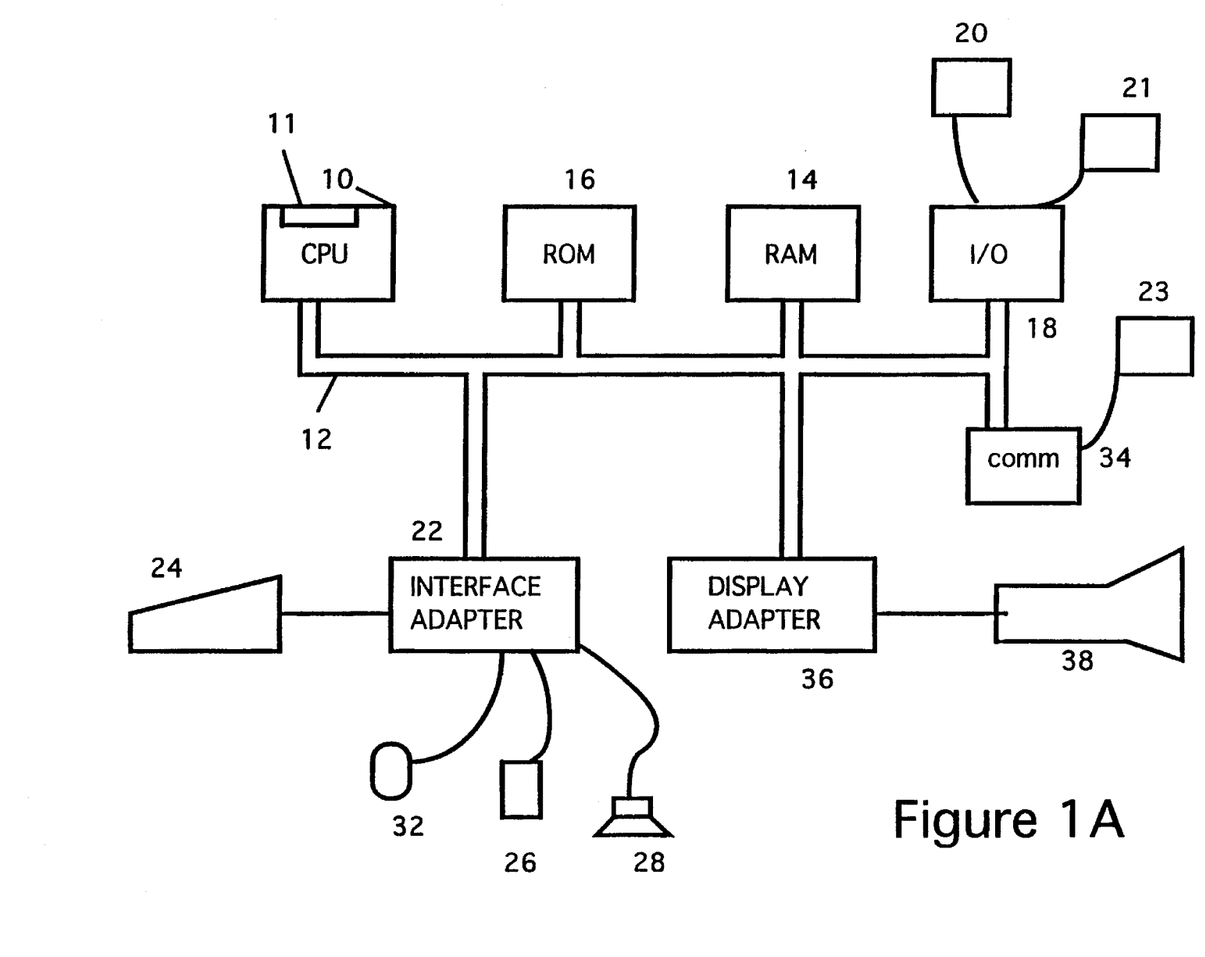
FIG. 1 is a Booch diagram illustrating the organization of classes of objects in accordance with the invention.
Figure 1B:
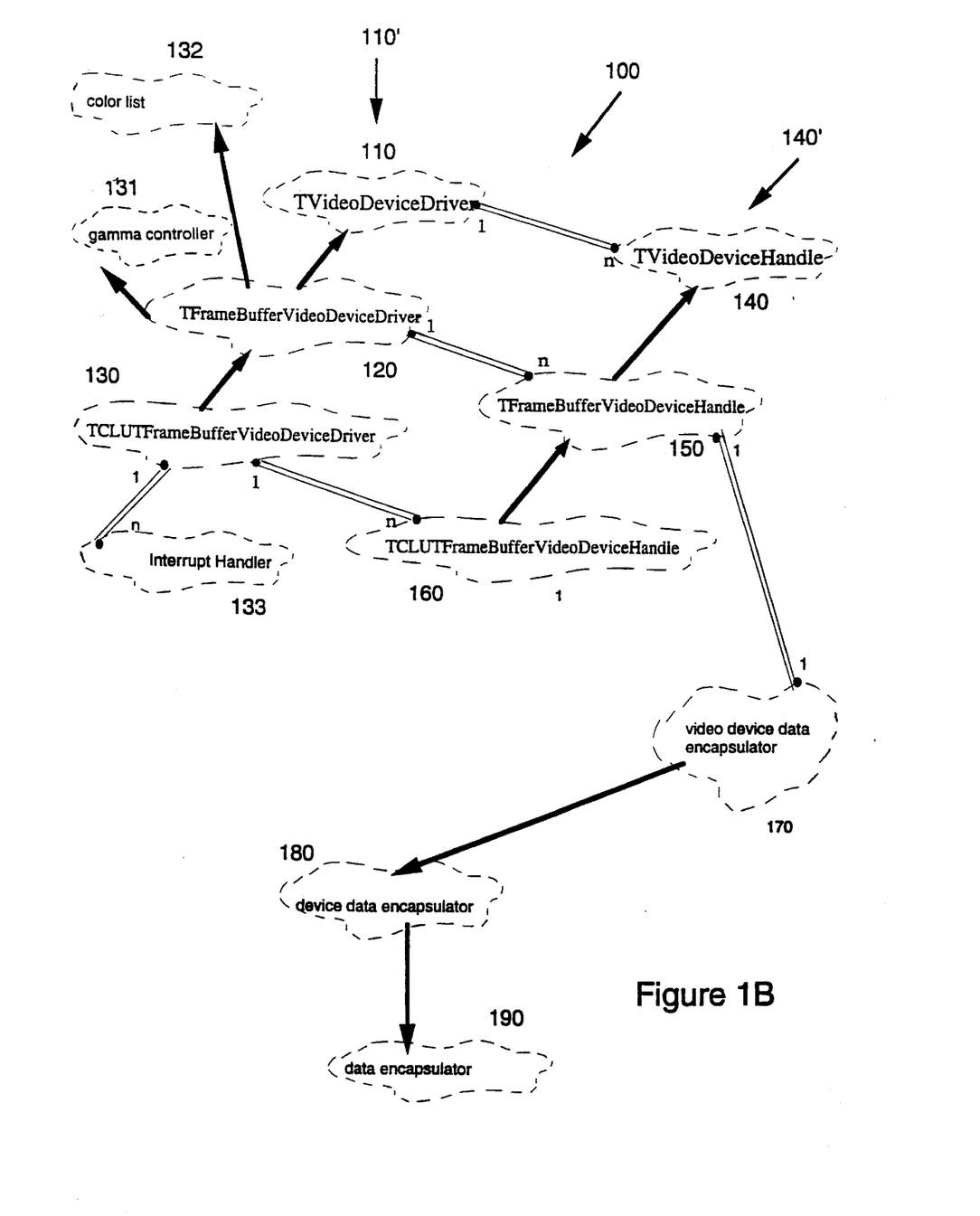

Referring now to the drawings, and more particularly to FIG. 1, there is shown a Booch diagram illustrative of the basic organization of the preferred embodiment of the invention. As is customary in such diagrams, "clouds" formed with dashed lines are indicative of classes or subclasses of objects (in the object-oriented programming sense of the term) for illustrating a hierarchy thereof in accordance with arrows; each arrow pointing to a next higher level of the hierarchy and thus representing an "is a" relationship. (It is to be understood that dashed lines are a convention to distinguish classes of objects from singular objects and no inference that the classes so depicted are in any way conventional is intended by such depiction. For example, solid line boxes could be substituted for the dashed line "clouds" of Booch diagrams to form a schematic diagram having substantially the same content.) Double lines connecting "clouds" represent a "has a" or containment relationship between classes and subclasses. Numbers adjacent the ends of the double lines indicates the correspondence, in number, between the respective classes or "cardinality" of their correspondence. This relationship is also referred to as a "uses" relationship and the dots at the ends of the double lines indicates the manner in which the use occurs. Solid dots at the end of the double lines indicates the class to be an internal implementation of the other class indicated and that no interface is required for that reason. Conversely, a light or open dot indicates that an interface is preferably provided. Other conventions of Booch diagrams will be explained hereinafter as further symbology is encountered. However, reference is made to "Object Oriented Design—With Applications" by Grady Booch, published by the Benjamin/Cummings Publishing Company, Inc., 1991, for further discussion of Booch diagrams and notations used therein.

It is considered to be preferable that the preferred embodiment of the invention be embodied in what has come to be known as object technology which has been developed from so-called object oriented programming. Object oriented programming has been of increasing interest as data processing technology has provided increased support for parallel or concurrent processing of many different tasks. In object technology, objects which are preferably emulated with a programmed general purpose computer but which could be considered or actually embodied as special purpose data processors, are provided to perform the various functions which are required. Data required for the relatively small number of methods or procedures which can be performed by each object are closely associated with the object, itself. The methods are encapsulated or hidden from other objects which can call for a particular method to be performed by the object.

Further, objects may be grouped by similar characteristics into classes or subclasses and characteristics of a class (either data or methods) may be inherited by a subclass and need not be otherwise specified. Additionally, inherited characteristics may be overridden by objects in a subclass; resulting in a property known as polymorphism (sometimes referred to as run time binding since the override is invoked with a method being performed).

Therefore, within the context of the preferred implementation of the preferred embodiment of the invention, objects and classes thereof are essentially functional elements of an overall system. The functional relationships between these elements are defined in terms of definition of responsibilities (e.g. methods or operations which include but are not limited to the creation of other objects) and the hierarchical dependencies relating objects and classes of objects. The act of defining the hierarchy and inheritance of objects is generally referred to as "subclassing". Accordingly, the preferred embodiment of the invention will be described in terms of the responsibilities and dependencies of an organization of classes and subclasses readily understood by those skilled in the art.

Virtually any data processing system will contain at least one display device or a display device driver. When the system is booted, internal codes will access various devices contained in (e.g. connected to) the system, including the display device(s) or driver(s), and provide for communication between each device and the central processor over an internal system bus. In broad terms, the video framework in accordance with the preferred embodiment of the invention is activated at this time and is responsive to continual or periodic traversing or "walking" of the bus by one or more configuration access managers to instantiate or delete display devices and drivers as well as to alter control of display presentation, as necessary, to reflect the present state of the system.

It is important to an appreciation of the nature of the preferred embodiment of the invention to understand the concept of a "framework" and the relationship of a framework to "objects" and "object oriented programming". "MACAPP: An Application Framework" by Kurt A. Schmucker, published in Byte magazine, August, 1986, is an early article describing a framework and the basic concepts embodied therein, which is hereby fully incorporated by reference. An important property of objects is their ability to encapsulate data and methods for which the object is responsible. That is, a generic command may be issued to an object without need for any other object to know the internal details of how the object will carry out the command. By the same token, there is no need for global compatibility of commands, data, file names and the like and thus objects may be freely associated with one another. Objects may also be associated as classes an subclasses in a hierarchy and inherit attributes of objects from which they descend in that hierarchy. Inherited attributes may be overridden, as desired, when the object performs a method, yielding a further property known as "polymorphism".

A framework is, in essence, a generic application comprising an association of classes of objects with which other objects may be associated, as necessary, to form a more specific application. The framework, as an association of classes of objects with functional interrelationships between classes of objects defined therein may provide any desired degree of general or specific functionality and will provide for correct functionality of additional objects which may be associated with the framework.

A framework may thus be regarded as a system which provides an implied network of responsibilities between objects, provides for inheritance between classes of objects (e.g. data and methods of superclasses at higher hierarchical levels of classes of objects), and provides for calling of libraries in response to events. A system formed as a framework may also be customized by the addition of objects which perform more specific functions and which may also override functions provided by the framework. Machine-specific and device-specific objects in various classes and subclasses of the framework allow the framework, itself, to be machine- and device-independent and of generalized applicability. Further, a particular framework is characterized by the interrelationships it establishes between objects and classes of objects in terms of division of responsibilities and inheritance and the functionality it thus achieves. A framework, itself, is also useful as a template for the development of specific applications in which customization and functional overrides may be provided as specific objects therein.

Specifically, as shown in FIG. 1, the basic arrangement 100 of the present preferred embodiment of the invention provides a hierarchy 110' of classes and subclasses of devices/drivers preferably including, in descending order, video devices/video device drivers (which are subclassed in parallel therein) 110, a frame buffer video device driver 120 and a color look up table (CLUT) frame buffer video device driver 130. A parallel hierarchy 140' of handles is also provided preferably including, in descending order, a class of video device handle objects 140, a subclass of frame buffer video device handle objects 150 and a subclass of CLUT frame buffer video device handle objects 160. Each of the classes in the hierarchy of handles contains a plurality of object type classes which serve as surrogates for the corresponding driver objects in the respective classes and subclasses of the driver hierarchy 110'. The various levels of the handles hierarchy allow clients (e.g. applications) to have access to the drivers at a plurality of levels of inheritance. The provision of a plurality of handles classes and subclasses for each driver class and subclass provides for a plurality of client-specific objects to be provided for access to any level of the driver hierarchy.

The classes depicted in FIG. 1 represent objects at various levels of abstraction. The key abstractions in accordance with the preferred embodiment of the invention are the video device handle, the video device driver and the video device data encapsulator from which respective hierarchies are subclassed.

The video device handle class 140 represents (e.g. are surrogates for), for purposes of client access, the portion of the video device or video device driver which manipulates the video device hardware. Specific device-dependent subclasses of the video device handle are used to configure hardware devices and report video timing, interrupt states and other aspects of the video signal in accordance with the current configuration. This abstraction thus understands the timing characteristics of a hardware video device and can empirically measure the drawing time of a sprite's bit level transfer (BLT or "Blit") rectangle for the purpose of answering subsequent queries in order to schedule the drawing thereof, as will be discussed in an example of sprite drawing, below.

The video device driver class 110 contains objects which directly manipulate the video device hardware and which are represented by corresponding handle classes and subclasses. As indicated above, video devices are subclassed in parallel with their corresponding video device driver subtypes. The video devices do not contain the hardware-specific implementation or interface contained by video device driver objects. However, this hardware-specific implementation or interface may be otherwise provided in hardware or software in the system and separate subclassing of standard video display device functions may not be necessary if non-standard behavior of the video display device is not required. Objects in the video device driver class 110 and frame buffer devices driver class 120 and CLUT frame buffer video device driver class 130 preferably provide all standard video display device behaviors within the video framework in accordance with the preferred embodiment of the invention.

The frame buffer video device and the CLUT frame buffer video device are more concrete subclass levels of abstraction in the video framework. Further abstractions of the CLUT frame buffer video device driver are gamma controller 131 and color list 132. ("Gamma", in the context of the present application, refers to tables of offsets to obtain a more or less linear visual response from a particular device for any image parameter, possibly including but not limited to contrast, depending on the visual response coordinate system applied to the color space of the device (e.g. RGB, CYMK, etc.) or the color gamut reproducible by the display device.) This allows a single list of colors and contrast controls to be used across the entire framework. The CLUT frame buffer also has (or contains) one or more interrupt handler classes 133 as an internal implementation thereof to add special, non-standard video device handle behavior, if necessary or desired.

The video device data encapsulator classes 170, one of which corresponds to each class of frame buffer video device handle 150, and the device data encapsulator 180 and data encapsulator class 190 hierarchically above them are not critical to the practice of the preferred embodiment of the invention. Since objects themselves provide encapsulation, it is only necessary to provide a class of objects to be called as an internal implementation within the frame buffer video device handle class 150 to achieve that purpose. Thus, any type of object that represents the possible or potential functionality of a display device may provide for a presentation of that functionality, preferably in the form of a configuration tool, through the video device handle.

Thus, through an application or another object, the operator can call for reconfiguration of a particular display device (e.g. such as by selecting a displayed data encapsulator icon with a mouse) and data can be returned in the form of a hardware based menu or image (e.g. of buttons for controlling bit depth or signal mapping to colors of a CLUT) as a graphical user interface for control of response to particular signals by a particular display device. By the same token, any control of the displayed image by any application can be sensed as an event which causes a return of a representation of potential functionality of the display device to which the display control is directed. Alternatively, objects can be provided to report any change in data within the data encapsulation hierarchy at the time of the change and the potential functionality of each display device changed in objects corresponding to each display device in the appropriate level of the handles hierarchy and conflicts resolved in response thereto. Therefore, a change in functionality of a display device, which can be effected by a user or by other actions in the system, such as disconnection of a display device or seizure of a display device by another processor, application or user, may be immediately sensed and appropriate change of display control accomplished in response thereto, as will be more fully discussed below.

Figure 2:
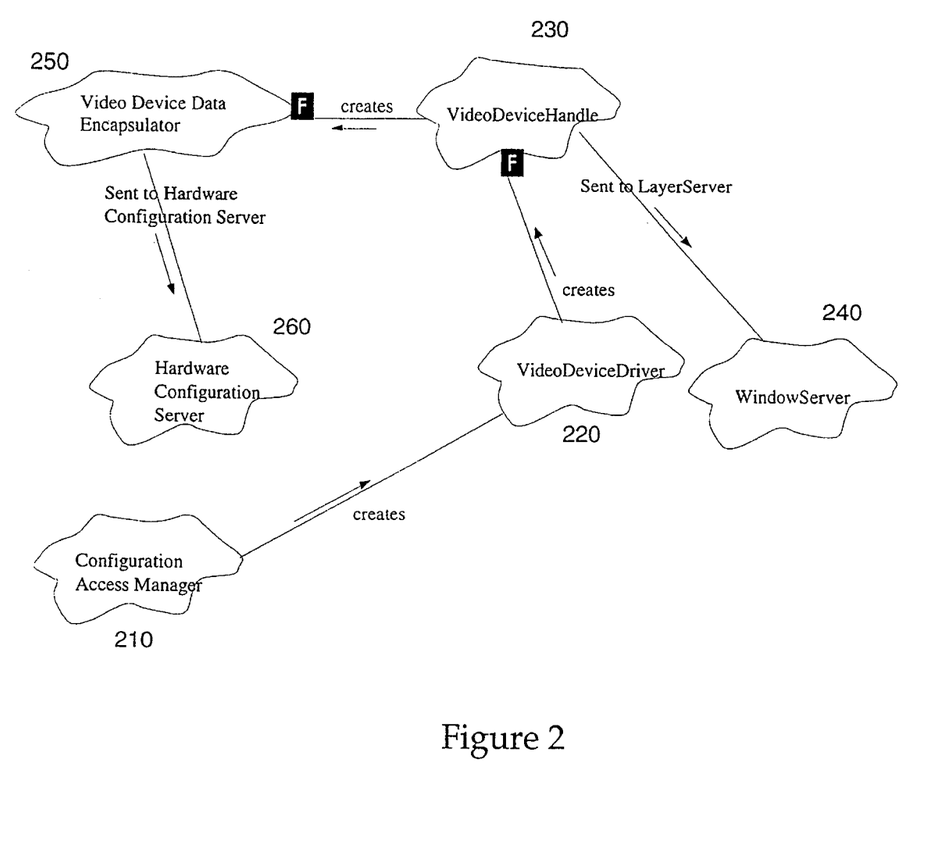
FIG. 2 is a Booch diagram illustrating the creation and cooperation of objects in the respective classes of FIG. 1, FIG. 3 and 4 are a schematic illustration of an implementation of the invention for a data processor employing a NuBus®.

More specifically and with reference to FIG. 2, which is a Booch diagram of particular objects (depicted by solid line "clouds") within respective classes depicted in FIG. 1, upon booting of the system, the devices connected to the system are found by the configuration access manager 210. Assuming a display device is found, a video device driver 220 will be created. For this purpose, at least a default display driver (e.g. generic to one of a plurality of display device types) in a generic form is preferably included within a library of the system which can be accessed by the video framework. The video device driver object 220, in turn, creates a video device handle object 230 by duplicating method calls in a field (as indicated by the box containing the letter "F", indicating "field") of the video device handle object and which thereafter may be accessed and used by a client application as an internal implementation of the video device handle 230 (as indicated by the filled/dark box). Once the video device handle 230 has been created, it identifies itself to the layer server 240 which controls the compositing of the actual display images under control of the client application. The video device handle also creates a video device data encapsulator 250 by forming a file containing information concerning the functionality of the display device as initially reported by the configuration access manager 210 and carried forward through the other objects illustrated in FIG. 2. This functionality is also then reported to a hardware configuration server 260 for confirmation of correspondence between the functionality of the device and its current configuration.

Referring again also to FIG. 1, once the objects of FIG. 2 have been created, a client application can now access a video device handle 230 and call for a change of configuration of a display device or the system. Such a call will alter the functionality data stored in a file of the video device data encapsulator 250 which will, in turn, send the change to hardware configuration server 260 to carry out the configuration change. Conversely, a change in display device status, based on a user action, such as turning off a display device, is detected by the system and the VideoDeviceHandle is updated accordingly. This status change is then reported through the video device handle 230 to the layer server 240 which will provide a default or other behavior to other members of the video handle classes and/or subclasses to redraw the displays on remaining display devices and to allocate display information therebetween. Once this is done, an acknowledgment is preferably returned to the particular video device handle object 230 to "deactivate" the video device handle 230 and the corresponding video device data encapsulator 250 and the video device driver, in turn, or modify them to reflect a forced change in system configuration (e.g. when a display device is seized by another application or processor).

Thus, in summary, any client or application can call for control of any particular display or displays by choice of an object from one of the levels of the handles hierarchy through an object therein. The system provided by the video framework in accordance with the preferred embodiment of the invention is fully generalized since any necessary device-specific objects may be placed within an appropriate level of the driver hierarchy and efficiency of execution is assured by the inheritance within that hierarchy. Similarly, any system-specific or application-specific objects necessary to achieve desired display device behavior can be placed in an appropriate level of the handles hierarchy. Control of the display image through an object in the handle classes or subclasses also becomes an event which can be used to trigger system reconfiguration and corresponding display control to allocate the display between devices which can render the display in the desired manner. In this manner, a default level of display functionality can always be maintained for a display device as a component of the video framework and need not be separately provided for each card or display device. The same framework architecture also simultaneously provides for automatic system reconfiguration and supports display redirection to correspond to the system configuration as it exists at any given time.

With the foregoing as a general overview of the general organization and basic architecture of the preferred embodiment of the invention, several exemplary implementations will now be discussed. In either a generalized case or a particular implementation, such as the following example utilizing an array of objects which will be referred to as a NuBus®, (a 32-bit bus implemented by Apple Computer, Inc. as contrasted with MicroChannel® and EISA buses, implemented by International Business Machines Corporation), there will be some control of access to system and device configuration information. Therefore, in a generalized case, it is sufficient for practice of the preferred embodiment of the invention to provide for the creation of and linkage (e.g. responsibilities and dependencies) between objects as discussed above with reference to FIG. 2 in response to particular events in the application or object which controls access to system or device configuration.

Figure 3:
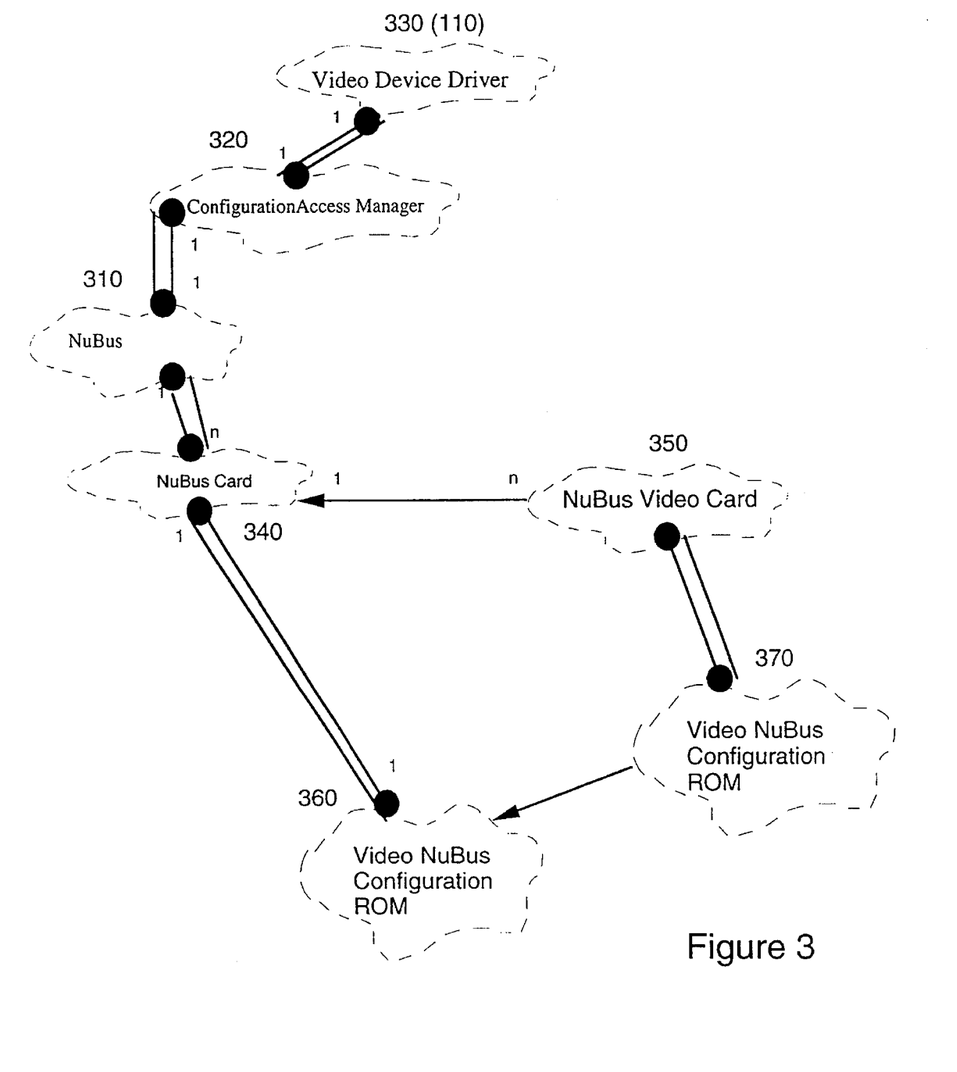

Referring to FIG. 3, on a system employing a NuBus®, a configuration access manager object 210 or class thereof 330 is preferably provided. The NuBus® class 310 of objects is a base class which defines the functionality of the NuBus® which includes a NuBus® framework, the internal details of which are (through encapsulation) generally unimportant to an understanding of the present preferred embodiment of the invention sufficient to the practice thereof by those skilled in the art. For purposes of understanding the video framework of the present preferred embodiment of the invention, the NuBus® class of objects at least contains a protocol for finding a card connected to the NuBus® and identifying it.

In essence, the NuBus® class of objects provides for periodically or continually "walking the bus" by calling configuration access manager objects (e.g. 210 of FIG. 2) to monitor changes in configuration. Functionally, the responsibility of these objects is to provide an access address to the configuration access manager object 210 or class of objects 320 as shown in FIGS. 2 or 3 (which corresponds to a portion of FIG. 2 at the class level of abstraction), respectively. Instances of the NuBus® class also contain methods for instantiating particular NuBus® card objects 340, such as a NuBus® video card 350, by passing a board identification code to the NuBus® card object.

Additionally, as shown in FIG. 3, a NuBus® configuration read only memory (ROM) class of objects 360, which has a one-to-one cardinality with the class of NuBus® card objects 340 contains information concerning the internal operation and functionality of any hardware card connectable to the system for controlling creation of more specific objects such as NuBus® video card objects 350. The NuBus® configuration ROM objects thus represent the NuBus® card ROM that contains mandatory information fields such as format header blocks and the board resource list. The NuBus® configuration ROM class may also be subclassed to provide selectors for unique features or functionalities of cards as is shown by the video NuBus® configuration ROM class 370 which has a one-to-one cardinality with the NuBus® video card class 350.

Figure 4:
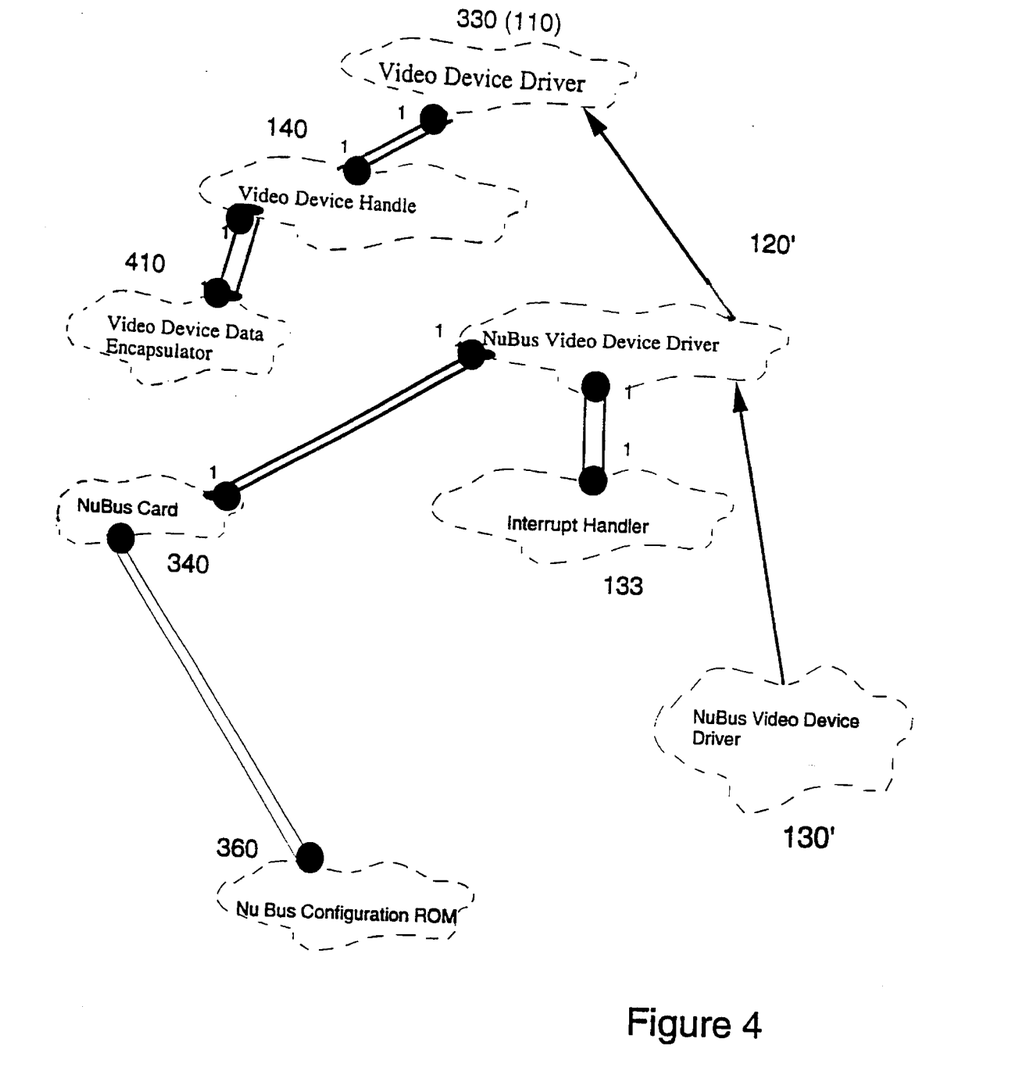

Referring now to FIG. 4 (which may be regarded as a continuation to the right of FIG. 3), the NuBus® implementation is seen to include a hierarchy of driver classes and subclasses including video device driver class 330 (corresponding to class 110 of FIG. 1), NuBus® video device driver class 120' and NuBus® CLUT video device driver subclass 130'. It is also preferable to be able to obtain display device functionality information, represented by a video device handle class, for a graphical visual display of device configuration to assist a user in any desired device reconfiguration. For this reason, The video device driver class 330 directly contains, as an internal implementation, the video device data encapsulator 410 together with the video device handle class 140 (depicted with dashed double lines extending through the video device handle class 140) with a one-to-one cardinality.

Thus, a selection of a class of data encapsulator allows a video device handle object to present an appropriate representation of the possible functionality of a device and choices for user control, such as the use of a CLUT versus 32-bit color, gamma (e.g. visual response non-linearity correction or compensation) table choices, and similar user-configurable aspects of the video device handle objects by which a display device is accessed by an application. Also in this implementation, the interrupt handler class 133' is contained by the NuBus® video driver class 120'.

Figure 5:
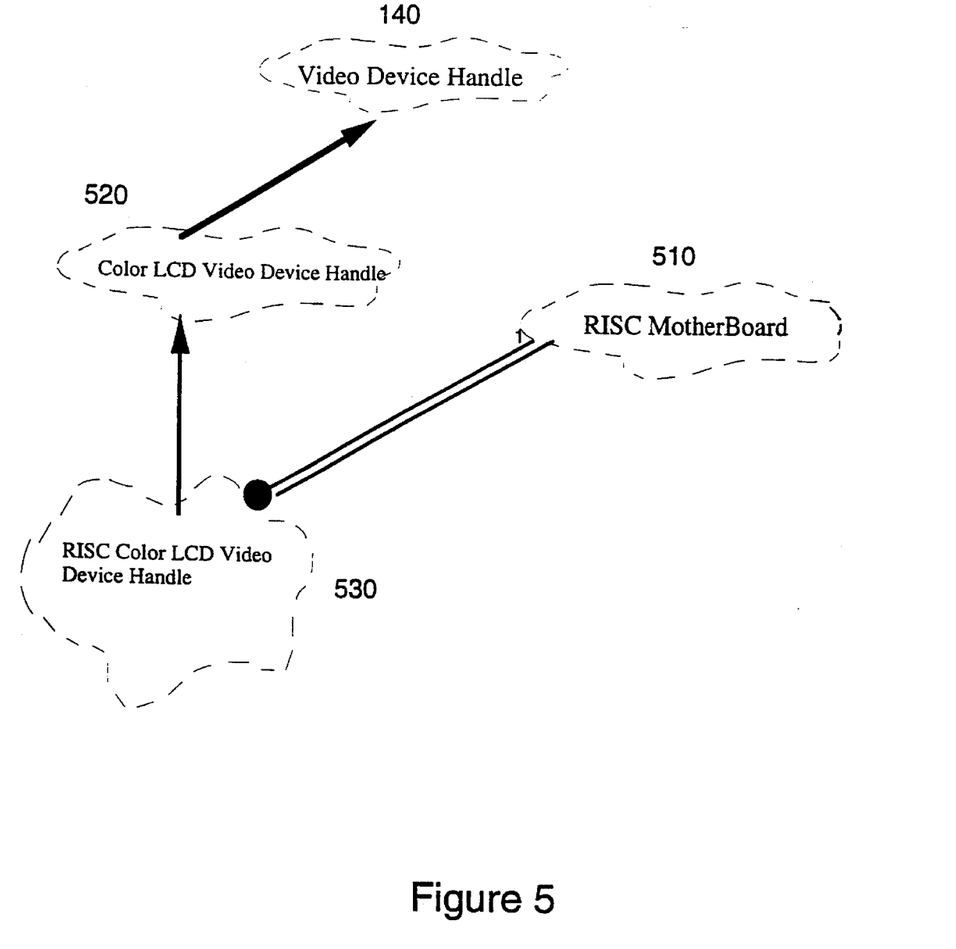
FIG. 5 is a schematic illustration of application of the invention to a reduced instruction set (RISC computer, FIG. 6 is a schematic illustration of application of the invention to a Small Computer Interface System (SCSI) video controller, FIG. 7 illustrates creation of graphic devices by several classes of objects in accordance with the invention, FIG. 8 illustrates system dependencies of the video framework in accordance with the invention, FIG. 9 illustrates the preferred behavior of a window server in accordance with the invention.

A color liquid crystal display (LCD) for a reduced instruction set computer (RISC) will now be explained as another exemplary implementation of the preferred embodiment of the invention, with reference to FIG. 5. In this implementation, a key abstraction is a class of video device handles 140 corresponding to the same class as shown in FIG. 1. Assuming an LCD display, the remainder of the "handles" hierarchy will include a color LCD video device handle class 520 and a RISC color LCD video device handle class 530 sequentially subclassed beneath the video device handle class 140. Another key abstraction is the class of RISC motherboard objects 510 which is contained by the RISC color LCD video device handle class 530. The RISC motherboard objects, in this case, provide protocols for finding accessible display devices as well as controlling the configuration access manager to "walk the bus", as before. When a display device is found, a RISC color LCD video device handle object is instantiated. This object may then further utilize the functionality of RISC motherboard objects to locate various aspects of itself, such as the memory mapped locations which it uses and other details which may be specific to the motherboard. Thus, generality of this implementation of the preferred embodiment of the invention is maintained.

Figure 6:
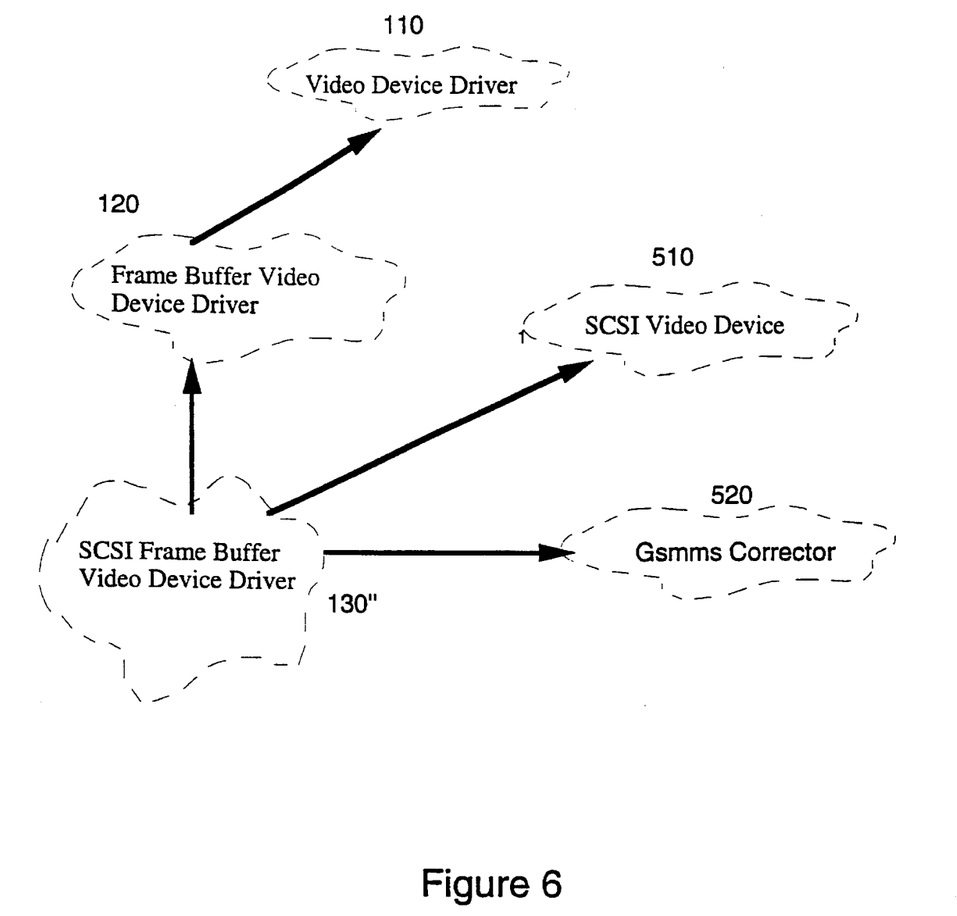

Referring now to FIG. 6, an implementation of the preferred embodiment of the invention which includes a SCSI video controller will now be discussed. In this implementation, the driver hierarchy includes a video device driver class 110 and frame buffer video device driver class 120 subclassed beneath it, as in FIG. 1, and an SCSI frame buffer device driver 130 subclassed under the frame buffer video device driver class 120. Objects in the SCSI frame buffer video device driver class 130 contain information and procedures for creation of SCSI video device object(s) which can then be flattened and sent to the layer server (240 of FIG. 2). The SCSI frame buffer video device driver will also preferably contain the SCSI ability as a field or a so-called "mixin" in order to use SCSI bus protocols to query the SCSI device hardware and receive information to identify it properly. A mixin is a class that is multiply inherited and adds extra functionality. Mixin is a standard OOP term. It is also preferred that SCSI frame buffer video device driver objects be SCSI aware in order to have the capability of breaking down SCSI operations and therefore should preferably include SCSI access managers and a SCSI interrupt handler (as shown at 133 of FIG. 1) for the video device itself.

It should be understood that the above exemplary implementation including an SCSI video controller illustrates how the video framework in accordance with the preferred embodiment of the invention supports frame buffer and Gamma control behaviors and how the video framework of the preferred embodiment of the invention is able to use data and control transport protocols which are foreign to the remainder of the system. The video framework functionality is separated from the system bus and interface architectures. It should also be appreciated from all of the above exemplary implementations that any or all of these variations of the preferred embodiment of the invention may be simultaneously implemented by the attachment of specific objects to various points of the basic video framework architecture of FIG. 1. For example, the implementation of FIG. 5 can be accomplished by subclassing the color LCD video device handle and the RISC color LCD video device handle (containing the RISC motherboard class 510) classes 520 and 530 from the video device handle class 140. This subclassing is entirely independent from the NuBus® implementation and the SCSI video controller implementations and can thus be accomplished in combination with either or both of these implementations. However, it is anticipated that most objects added to the video framework in accordance with the preferred embodiment of the invention will include subclassing of objects (e.g. providing additional, differentiated objects) at lower hierarchical levels than the video device driver and video device handle classes 110 and 140, possibly including override of objects which are preferably provided in levels of the video framework from which such subclassing is done, in order to provide particular device-specific functionality.

The addition of further objects with or without further subclassing of objects can be continued to any desired degree in accordance with the preferred embodiment of the invention. For example, during boot procedures and error handling, it is desirable to provide the ability to display some information on the screen of some display device, even in the absence of most of the objects comprising the video framework, many of which are created on an as needed basis, as described above with reference to FIG. 2. A fully robust and stand-alone graphics system, of course, could only be provided at the cost of loss of flexibility, particularly for upgrading and adding hardware display devices, accelerators, co-processors and the like because such robustness would require all possibly needed objects to be continually available (such as in read-only memory (ROM)). Realistically, it is preferred to provide some objects as a graphics class, of which any application or the processor itself (e.g. through a boot conductor object) can be a client, which has a minimal but yet fully described set of dependent classes or servers.

Figure 7:
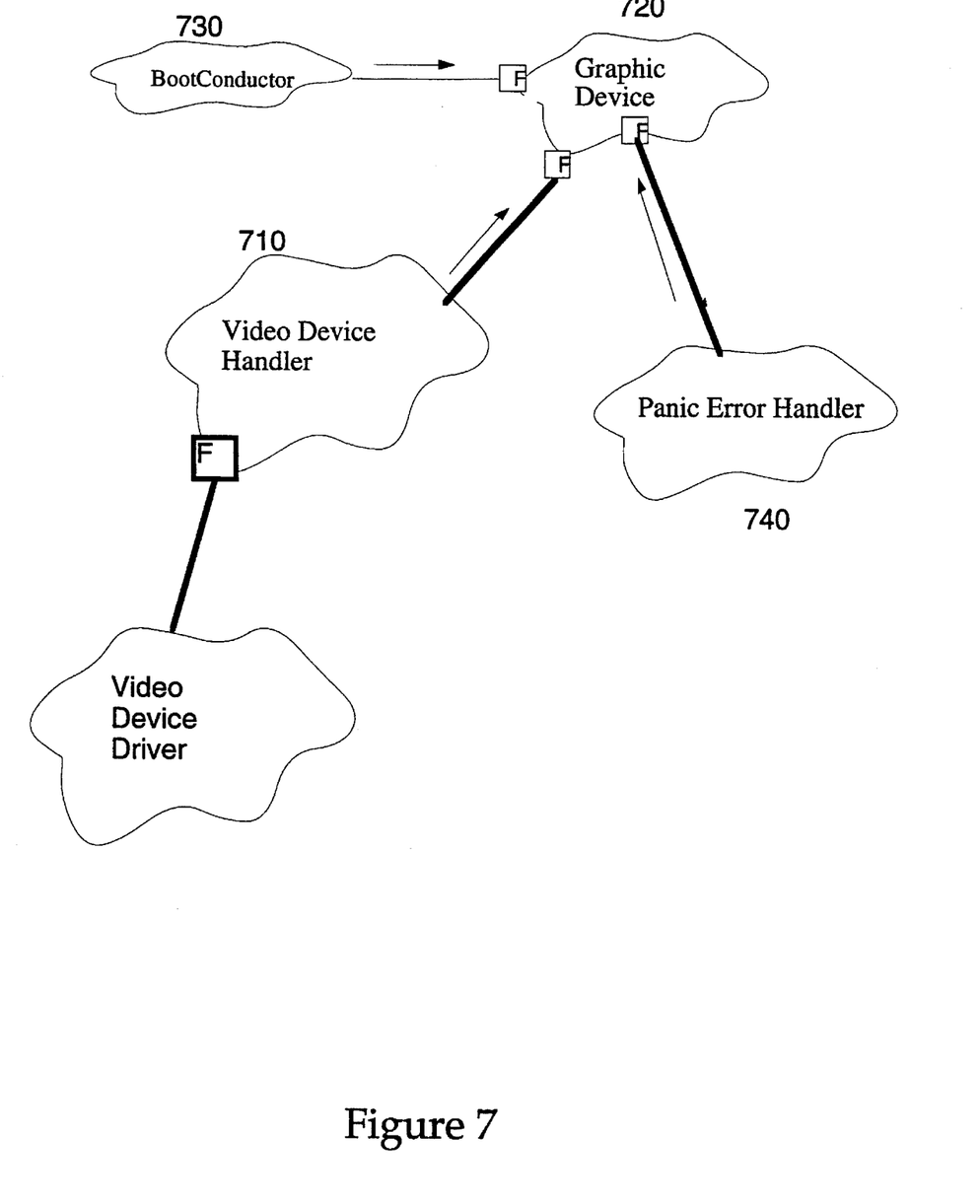

Accordingly, as shown in FIG. 7, any or all of a plurality of video device handle objects (e.g. 710) are provided with a process for creating a graphics device object 720 as a file, which, in the aggregate, comprises a graphics device system in shared memory. Each graphic device 720 preferably is in the form of a graphic screen image which supports a minimal set of graphical functions such as displaying text, drawing rectangles and copying images to the screen. It is also preferred to support some plurality of bits of pixel value depth for color or grey scale even though some clients, such as the boot conductor 730 and panic error handler 740 may only require monochrome display. The creation of these graphic devices 720 implies that at least the configuration access manager for the host processor be available from the video framework, itself.

Once created, the graphic device system is a small, stateless, self-sufficient system, does not require other servers in the system and is usable despite missing (e.g. damaged or not yet started) objects such as a token server, layer server, semaphore server and the like. Each change of system or device configuration after creation of the graphic devices 720 is relayed to the appropriate graphic device by the video device handle 710 so that the graphic devices objects will possess a current indication of the screen state, such as pixel bit mode, in order to use appropriate drawing methods.

It should be understood that specific objects in other parts of the video framework architecture are generally used for screen displays in accordance with various applications which may be run. The class of graphic devices objects 720 may preferably include a subset of these object in a particularly efficient way which minimizes reliance on the rest of the video framework. In this way, disruption of interaction with a user is limited and the user can be prompted to take remedial action, as may be necessary from time to time, using graphics devices which are similar to those appropriate to the application.

Figure 8:
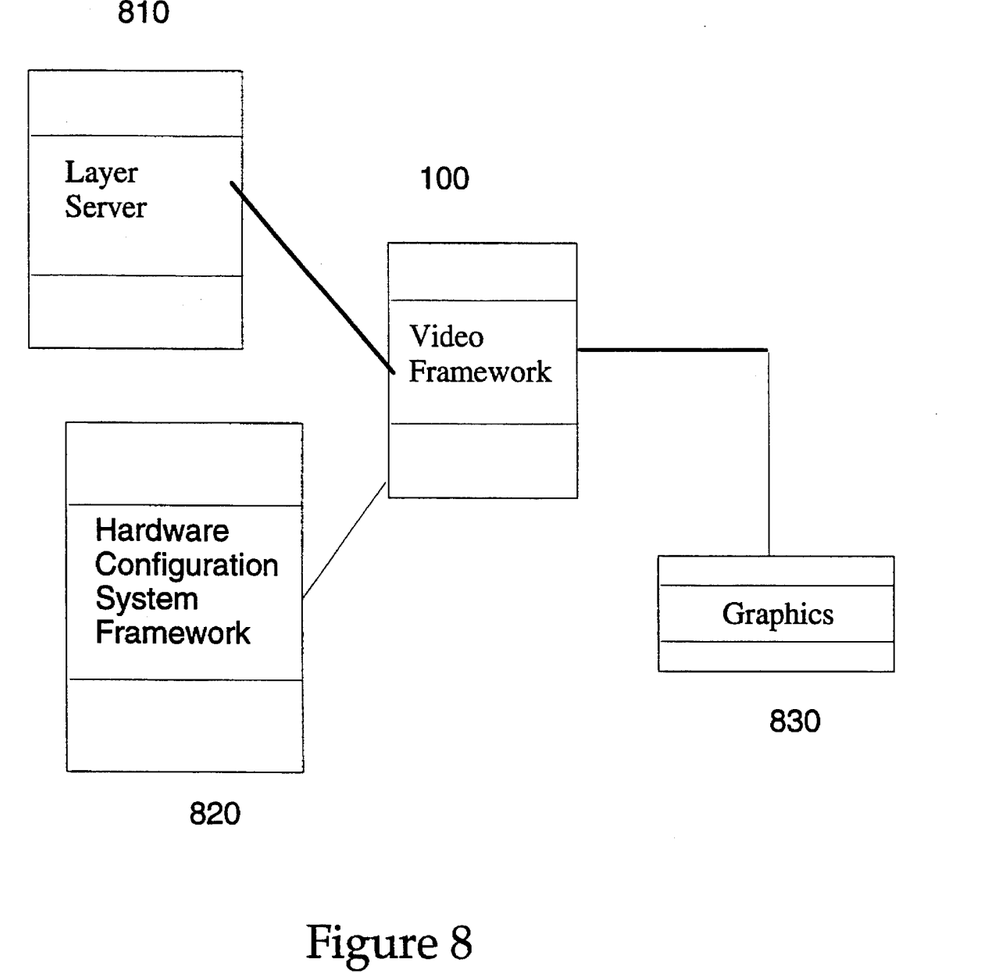

The major system dependencies of the video framework 100 of FIG. 1 are shown in FIG. 8. Specifically, the video framework 100 must interact efficiently with the layer server to provide a feature-complete drawing environment. The graphics system must support the drawing of tear-free graphics items by appropriate display synchronization 820. The system graphics devices 830, including the graphics devices 720, in most cases are supported by objects of frame buffer subtype objects of the video framework. These system dependencies will now be discussed in turn to explain the preferred embodiment of the invention.

Figure 9:
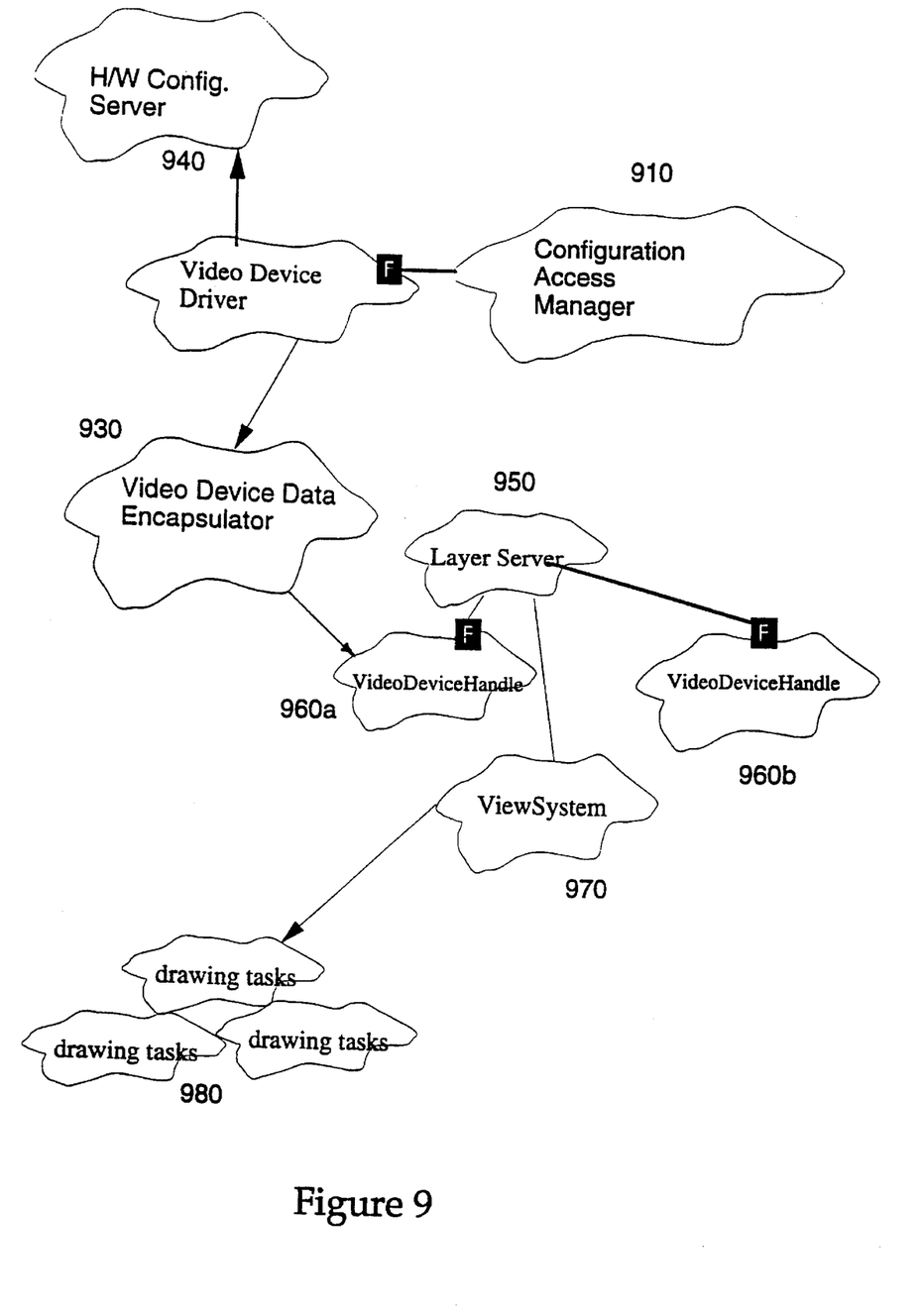

The following scenarios illustrated in FIG. 9 indicate the preferred behavior of the layer server. The objects in FIG. 9 (e.g. video device driver object 920) may be but are not necessarily the same objects (e.g. video device driver object 220) referred to above and new reference numbers have been applied accordingly. As discussed briefly above with reference to FIG. 2, a boot procedure includes a system start-up sequence which includes a configuration access manager 910 looking along the system bus for various portions of the system, including display devices. When a video display device is found, the corresponding video device driver object 920 is started or instantiated. The video device driver 920 then creates a video device data encapsulator object 930 and sends pertinent parameters thereof to hardware configuration server 940. The video device driver 920 also spawns a video device handle object such as 960a or 960b and sends it to layer server 950. These video device handle objects will later alert the layer server when configuration changes are made. The layer server, in turn, alerts the view system 970 of the impending configuration change and, in response, the view system locks down current drawing tasks 980 until the layer server 950 can call for regeneration of a display in accordance with the new system configuration. Once regenerated, the new display is regenerated through the view system in the normal manner. The video framework provides for automatic change of display rendering when a display is turned off or changed in any way. The changed display rendering prevents loss of window information or stored images due to changes in display layout and configuration.

It is preferable that the video framework of the preferred embodiment of the invention also support animation. Animation, including but not limited to live video is accomplished by synchronized bit level transfers (BLT or "Blit") of video information for rendering of a particular sprite. Both the bit level transfer and the rendering should be synchronized with the display device in order to avoid tearing of the sprite image produced. Therefore, the video framework must understand the properties of the display hardware and this information is preferably derived from an empirical measurement of the drawing time of the sprite's BLT rectangle carried out in response to the video device handle which will thereafter answer queries.

As a perfecting feature of the preferred embodiment of the invention for the drawing of animated sprites, an animation interrupt handler is preferably provided for hardware display devices which do not use a display location counter such a beam position counter. If a particular display device uses such a counter allows synchronization directly from the counter. However, with devices which use an interrupt such as vertical blanking (VBL) interrupt, a separate animation interrupt handler may be placed in the video framework in accordance with the preferred embodiment of the invention. In this case, the animation interrupt handler would receive the interrupt from the video device and marks the actual clock time of the interrupt. The sprite object can then pick up the last marked time and then calculate the next available time at which the sprite can be drawn subsequent to the BLT by which the next animation frame is provided.

In view of the foregoing, it is clear that the video framework in accordance with a preferred embodiment provides for dynamic reconfiguration of a data processing system in a device-independent and machine-independent manner which minimizes disruption of the display when the system reconfiguration is changed or when library files for operation of device-dependent display drivers cannot be accessed.

While the invention has been described in terms of a single preferred embodiment including several exemplary implementations thereof, those skilled in the art will recognize that the invention can be practiced with modification within the spirit and scope of the appended claims.

Having thus described my invention, what I claim as new and desire to secure by Letters Patent is as follows:

1. A video framework for processing graphic information, comprising:
   (a) processor;
   (b) a memory;
   (c) a class of video device drivers having at least one subclass derived therefrom in memory;
   (d) a class of video device handle objects having a subclass derived therefrom, each subclass of device handle objects corresponding to a subclass from the class of video device drivers stored in the memory; and
   (e) a class of data encapsulators having at least one video device data encapsulator subclass derived therefrom, wherein the class of video device handle objects includes means for instantiating a corresponding video device data encapsulator object to be used by the processor for processing the graphic information.

2. A video framework as recited in claim 1, including:
   (a) a configuration access manager class contained by the video device driver class, and
   (b) a class of bus access objects contained by the configuration access manager class.

3. A video framework as recited in claim 2, including a class of objects contained by the class of bus access objects representing display devices which are connectable to a bus accessed by objects of the class of bus access objects.

4. A video framework as recited in claim 1, including means for identifying, to the processor, a video device handle object, instantiated from the class of video device handle objects.

5. A video framework as recited in claim 1, including means for recording status information.

6. A video framework as recited in claim 1, including means for reporting status changes to the processor.

7. A video framework as recited in claim 1, including means for managing a plurality of video frameworks by the processor.

8. A video framework as recited in claim 7, including means for activating a video framework.

9. A video framework as recited in claim 7, including means for deactivating a framework.

10. A method for processing graphic information in a memory of a processor, including the steps of:
    (a) creating a video device driver object from a configuration access manager object in the memory under control of the processor;
    (b) creating a video device handle object from the video device driver object in the memory under control of the processor;
    (c) creating a video device data encapsulator object from the video device handle object in the memory;
    (d) sending parameters of the video device handle object to a layer server in the memory under control of the processor; and
    (e) associating the video device handle object with the video device driver object.

11. The method as recited in claim 10, including the step of sending parameters of the video device data encapsulator object to a hardware configuration server.

12. The method as recited in claim 10, including the step of identifying a video device handle object, instantiated from the class of video device handle objects to the processor.

13. The method as recited in claim 10, including the step of recording status information in the memory.

14. The method as recited in claim 10, including the step of reporting status changes to the processor.

15. The method as recited in claim 10, including the step of managing a plurality of Video frameworks by the processor.

16. The method as recited in claim 15, including means for activating a video framework.

17. The method as recited in claim 15, including means for deactivating a framework.

18. A method for processing graphic information in a memory of a processor, including the steps of:
(a) creating a video device data encapsulator object in response to detection of at least one of a configuration change of the processor;
(b) sending a parameter of the configuration change to a video device handle object which contains the video device data encapsulator object;
(c) locking drawing tasks on at least one display device in response to a signal generated by the video device handle object;
(d) changing a configuration of the processor by altering or creating a video device handle, and
(e) issuing a command to a video device handle to cause the video device handle to regenerate a display corresponding to the drawing tasks as locked, and to release the locking of the drawing tasks.

19. A video framework for allowing a client to manipulate video devices, the framework comprising:
a hierarchy of video device subclasses derived from a base video device class, each of the video device subclasses comprising a device data component and device control methods for manipulating a predetermined type of video device;
a hierarchy of video device handle subclasses derived from a base class of video device handle class, the hierarchy of video device handle subclasses including a subclass corresponding to each of the video device subclasses, each of the video device handle subclasses comprising a data component and methods for interfacing with the client;
and wherein each of the video device subclasses comprises object methods for instantiating a video device handle object from a corresponding subclass and an object method for copying at least one of the device control methods into the video device handle object.

20. The video framework of claim 19 further comprising a hierarchy of data encapsulator subclasses derived from a base data encapsulator class, each of the data encapsulator subclasses comprising a data component and methods for storing and manipulating video data and wherein at least one of the video device handle subclasses comprises object methods for instantiating a data encapsulator object from one of the data encapsulator subclasses.

21. The video framework of claim 19 wherein the framework operates within an operating system and wherein each of the video device handle subclasses comprises methods for identifying a video device handle object instantiated from the each video device handle subclass to the operating system.

22. The video framework of claim 19 wherein the hierarchy of video device handle subclasses comprises a frame buffer video device handle subclass and wherein the hierarchy of video device subclasses comprises a frame buffer video device driver subclass having a control data component and control methods for manipulating a video frame buffer and a method for instantiating a frame buffer video device handle object from the frame buffer video device handle subclass.

23. The video framework of claim 22 wherein the hierarchy of video device handle subclasses comprises a color lookup table frame buffer video device handle subclass derived from the frame buffer video device handle subclass and wherein the hierarchy of video device subclasses comprises a color lookup table frame buffer video device driver subclass derived from the frame buffer video device driver subclass, the color lookup table frame buffer video device driver subclass having a control data component and control methods for manipulating a color lookup table and a method for instantiating a color lookup table frame buffer video device handle object from the color lookup table frame buffer video device handle subclass.

24. The video framework of claim 23 further comprising an interrupt handler class and wherein the color look up table frame buffer video device driver subclass contains a reference to at least one interrupt handler object instantiated from the interrupt handler class.

25. The video framework of claim 19 wherein at least one of the video device handle subclasses includes a method for instantiating a graphics device object that provides a minimal set of graphical functions.

26. A method of using a video framework to create a video device driver hierarchy accessible to a client, the video flamework having a base video device class and a base video device handle class, the method comprising the steps of:
(a) deriving a hierarchy of video device subclasses from the base video device class such that each of the video device subclasses comprises a device data component and device control methods for manipulating a predetermined type of video device;
(b) deriving a hierarchy of video device handle subclasses from the base video device handle class to include a video device handle subclass correspond to a video device subclass, and such that each of the video device handle subclasses comprises a data component and methods for interfacing with the client; and
wherein each of the derived video device subclasses comprises object methods for instantiating a video device handle object from a corresponding video device handle subclass and further comprises an object method for copying at least one of the device control methods into the video device handle object.

27. The method of claim 26, wherein the framework further comprises a base data encapsulator class, and the method further comprises a step of:
(c) deriving a hierarchy of video device data encapsulator subclasses such that each comprises a data component and methods for storing and manipulating video data, and
wherein step (b) includes deriving at least one video device handle subclass comprising object methods for instantiating a data encapsulator object from one of the video data encapsulator subclasses.

28. The method of claim 26 wherein the framework operates within an operating system and wherein step (b) includes:
(b1) deriving each of the video device handle subclasses so as to comprise methods for identifying to the operating system a video device handle object instantiated from the each video device handle subclass.

29. The method of claim 26 wherein step (b) includes:

(b2) deriving a frame buffer video device handle subclass within the hierarchy of video device handle subclasses, and wherein step (a) includes the step of:

(a1) deriving a frame buffer video device driver subclass within the hierarchy of video device subclasses such that the frame buffer video device driver subclass includes control data component and control methods for manipulating a video frame buffer and a method for instantiating a frame buffer video device handle object from the frame buffer video device handle subclass.

30. The method of claim 29 wherein step (b) includes the step of:

(b3) deriving a color lookup table frame buffer video device handle subclass within the hierarchy of video device handle subclasses from the frame buffer video device handle subclass, and wherein step (a) includes the step of:

(a2) deriving a color lookup table frame buffer video device driver subclass within the hierarchy of video device subclasses from the frame buffer video device driver subclass, such that the color lookup table frame buffer video device driver subclass includes a control data component and control methods for manipulating a color lookup table and a method for instantiating a color lookup table frame buffer video device handle object from the color lookup table frame buffer video device handle subclass.

31. The method of claim 30 further comprising a step of (d) deriving an interrupt handler class, and wherein step (a2) includes the step of:

(a2.1) deriving the color look up table frame buffer video device driver subclass to contain a reference to at least one interrupt handler object instantiated from the interrupt handler class.

32. The method of claim 26 wherein step (b) includes the step of:

(b4) deriving at least one of the video device handle subclass to include a method for instantiating a graphics device object that provides a minimal set of graphical functions.

* * * * *